US009909924B2

(12) United States Patent
Maes et al.

(10) Patent No.: US 9,909,924 B2
(45) Date of Patent: Mar. 6, 2018

(54) INFRARED THERMAL SENSOR WITH BEAM WITHOUT THERMOCOUPLE

(71) Applicant: MELEXIS TECHNOLOGIES NV, Tessenderlo (BE)

(72) Inventors: Ben Maes, Lommel (BE); Carl Van Buggenhout, Aalst (BE); Appolonius Jacobus Van Der Wiel, Duisberg (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 88 days.

(21) Appl. No.: 15/107,065

(22) PCT Filed: Dec. 13, 2014

(86) PCT No.: PCT/EP2014/077656
§ 371 (c)(1),
(2) Date: Jun. 21, 2016

(87) PCT Pub. No.: WO2015/091297
PCT Pub. Date: Jun. 25, 2015

(65) Prior Publication Data
US 2017/0003172 A1 Jan. 5, 2017

(30) Foreign Application Priority Data
Dec. 22, 2013 (GB) .................................. 1322828.3

(51) Int. Cl.
*G01J 5/12* (2006.01)
*G01J 5/02* (2006.01)
(Continued)

(52) U.S. Cl.
CPC ............. *G01J 5/023* (2013.01); *G01J 5/0225* (2013.01); *G01J 5/12* (2013.01); *G01J 5/14* (2013.01); *G01J 5/16* (2013.01); *G01J 2005/123* (2013.01)

(58) Field of Classification Search
None
See application file for complete search history.

(56) References Cited

U.S. PATENT DOCUMENTS 5,583,058 A 12/1996 Utsumi et al.
6,342,667 B1 1/2002 Shen et al.
(Continued)

FOREIGN PATENT DOCUMENTS

EP 1213570 A2 6/2002
GB 2154367 A 9/1985

OTHER PUBLICATIONS

Great Britain Search Report for corresponding Great Britain Application No. 1322828.3, dated May 15, 2014.
(Continued)

*Primary Examiner* — Edwin Gunberg
(74) *Attorney, Agent, or Firm* — Workman Nydegger

(57) ABSTRACT

An infrared thermal sensor for sensing infrared radiation is disclosed. The infrared thermal sensor comprises a substrate and a cap structure together forming a sealed cavity, a membrane arranged in said cavity for receiving infrared radiation (IR) through a window or aperture and a plurality of beams for suspending the membrane. At least one beam has a thermocouple arranged therein or thereon for measuring a temperature difference (ΔT) between the membrane and the substrate, the plurality of beams. Furthermore at least one beam is mechanically supporting the membrane without a thermocouple being present therein or thereon.

14 Claims, 7 Drawing Sheets

(51) Int. Cl.
 G01J 5/16 (2006.01)
 G01J 5/14 (2006.01)

(56) References Cited

U.S. PATENT DOCUMENTS

2007/0034799 A1 2/2007 Watanabe
2009/0184246 A1 7/2009 Abe
2011/0174978 A1 7/2011 Forg et al.

OTHER PUBLICATIONS

International Search Report for corresponding International PCT Application No. PCT/EP2014/077656, dated Feb. 27, 2015.

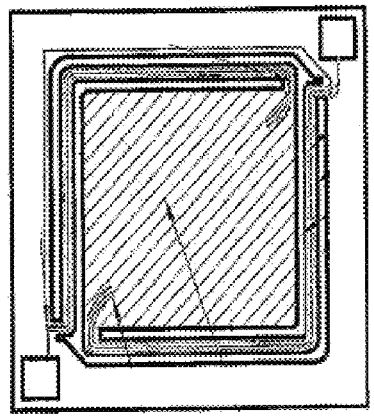
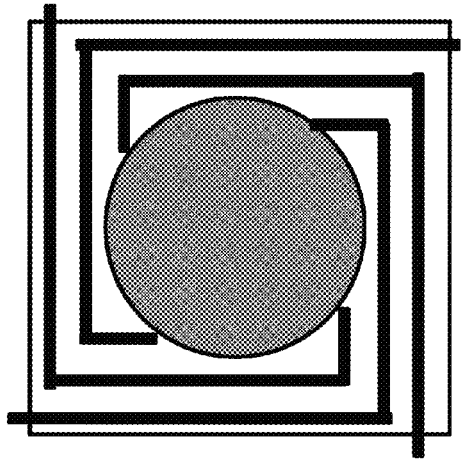
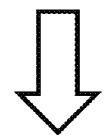
FIG 6
FIG 7
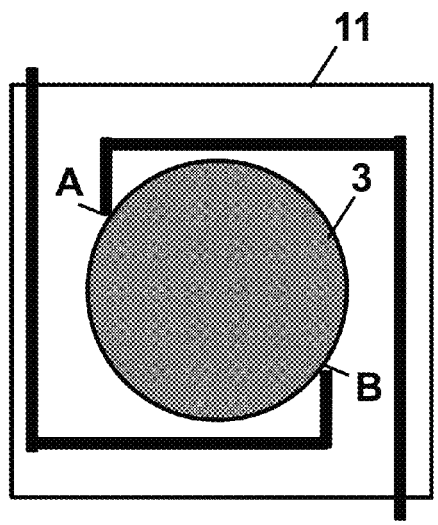
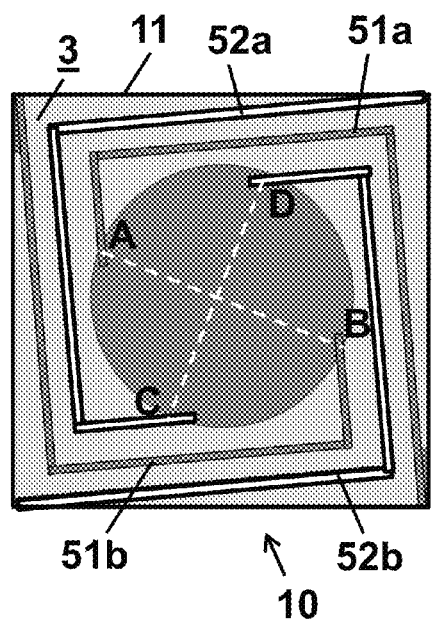
FIG 8
FIG 9

INFRARED THERMAL SENSOR WITH BEAM WITHOUT THERMOCOUPLE

FIELD OF THE INVENTION

The invention relates to the field of thermal infra-red sensors, more in particular to an infrared thermal sensor comprising a membrane suspended in a cavity by means of a plurality of beams.

BACKGROUND OF THE INVENTION

Thermal infrared sensors (also known as "infrared thermal pixels", although this term is typically only used when an array of sensors is used) comprising a membrane (also known as "diaphragm") suspended in a cavity by means of a plurality of beams (also known as "webs") and having thermocouples arranged on said beams with one end located on the membrane and another end located on the substrate (also known as "bulk"), are known in the art.

The membrane is typically chosen as large as possible for maximizing infrared light reception, the beams must be mechanically sufficiently strong for carrying the membrane, and are typically chosen as long and as small as possible for minimizing heat loss from the membrane through the beams towards the substrate.

The working principle is as follows: an external object (or subject) emits IR radiation, which typically enters the cavity via a window or aperture in the package, and warms up the membrane, causing a temperature difference $\Delta T$ above the bulk temperature, which temperature difference is measured by means of a thermopile, i.e. a plurality of thermocouples connected in series. The thermopile provides a voltage indicative of the temperature difference.

Several different designs are described in the prior art. They can roughly be divided in two groups: a first group where the pressure in the cavity is "high-vacuum" (e.g. less than 100 mPa), and a second group where the pressure in the cavity is much higher, often referred to as "not high-vacuum" or "low vacuum", typically having a pressure higher than 100 Pa (1 mbar). High vacuum devices typically provide larger signals, but require a more expensive sealing technique.

US2011/0174978 describes a thermal infrared sensor, some embodiments of which are replicated in this document as FIG. 1(a) to FIG. 1(d), illustrating some examples of thermal infrared sensors available on the market. Although several designs are shown for obtaining a good performance of the thermal sensor, further optimization still seems possible.

In view of the importance for thermal infrared sensors for having good detectability, there is still room for improvement.

SUMMARY OF THE INVENTION

It is an object of embodiments of the present invention to provide an infrared thermal pixel with a good performance, in particular in terms of signal-to-noise ratio.

This objective is accomplished by a method and device according to embodiments of the present invention.

The present invention relates to an infrared thermal sensor for sensing infrared radiation, the infrared thermal sensor comprising a substrate and a cap structure together forming a sealed cavity;

a membrane arranged in said cavity for receiving infrared radiation (IR) through a window or aperture;

a plurality of beams for suspending the membrane comprising at least one beam having a thermocouple arranged therein or thereon for measuring a temperature difference ($\Delta T$) between the membrane and the substrate, the plurality of beams furthermore comprising at least one beam mechanically supporting the membrane without a thermocouple being present therein or thereon.

The sensor comprises at least two beams. It was surprisingly found that, omitting the thermocouple from at least one of the beams, can increase the SNR of the signal provided by the thermocouple(s), while maintaining the mechanical stability. It has been realized that a thermal sensor could have beams without a thermocouple and that this may be beneficial for obtaining both a good SNR and a good mechanical stability, or that the SNR can be improved by omitting thermocouple(s) from the beams, especially in case of low pressures, i.e. high vacuum, where the effect of the thermal conductivity through the thermocouple plays a more important role.

The filling factor of the membrane in the cavity may be less than 50%. Alternatively, the filling factor may be larger than 50%. The pressure in the cavity may be less than 10 Pa, advantageously between 1 Pa and 0.1 Pa.

The beams in the plurality of beams may be selected so that a ratio of the thermal resistance (RT1) between the membrane and the substrate via radiation and convection and conduction through the gas medium in the cavity and through the part of the beam other than through the thermocouples, and the combined thermal resistance (RT2) between the membrane (4) and the substrate through the thermocouples (6) via conduction is a value in the range of 0.9 to 1.1. The membrane may be substantially circular in cross section in a plane parallel with the substrate.

The cavity may have a substantially polygonal cross section with n corners in a plane parallel with the substrate. The polygonal may be a rectangle.

The number (Nb) of beams may be three, and two beams may comprise a thermocouple whereby one beam does not comprise a thermocouple, or one beam may comprise a thermocouple whereby two beams do not comprise a thermocouple.

The number (Nb) of beams may be four and three beams may comprise a thermocouple whereby one beam does not comprise a thermocouple, or two beams may comprise a thermocouple whereby two beams do not comprise a thermocouple, or one beam may comprise a thermocouple whereby three beams do not comprise a thermocouple.

All the thermocouples may be connected in series for providing a combined voltage signal (S) indicative for the effect of the infrared radiation (IR). The infrared thermal sensor may comprise at least two thermocouples, and the at least two thermocouples may be connected in anti-series for allowing determination of the zero-offset. Each thermocouple may consist of an n type polysilicon resistor in combination with a p type polysilicon resistor, placed on top of each other.

The present invention also relates to a sensor system comprising at least one infrared thermal sensor as described above.

The present invention also relates to the use of an infrared thermal sensor as described above for sensing infrared radiation.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 6 is a copy of FIG. 1(b) and shows a prior art infrared thermal pixel, with two beams having three thermocouples each.

FIG. 7 shows an infrared thermal sensor with two (long and narrow) beams, each beam having one thermocouple.

FIG. 8 shows an infrared thermal sensor with four (long and narrow) beams, each beam having one thermocouple.

FIG. 9 shows an infrared thermal sensor according to embodiments of aspects of the present invention, with four beams, only two beams having a thermocouple.

Figure 1:
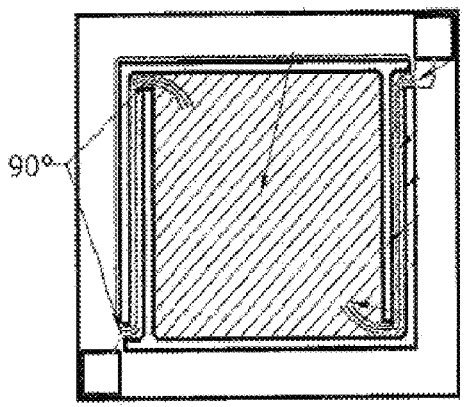
FIG. 1(a) to FIG. 1(d) show four embodiments of a prior art infrared thermal pixel, wherein a square membrane is suspended by two beams, and wherein the beam length is 1×, 2×, or 3× the length of the size of the membrane.
Figure 1:
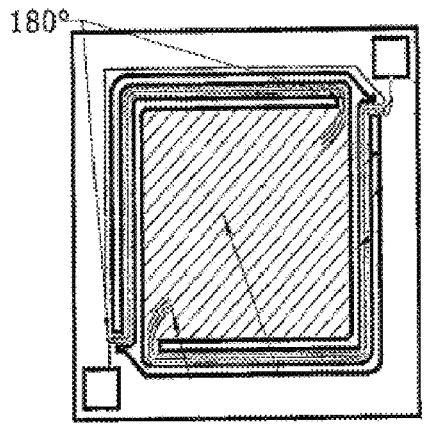
Figure 1:
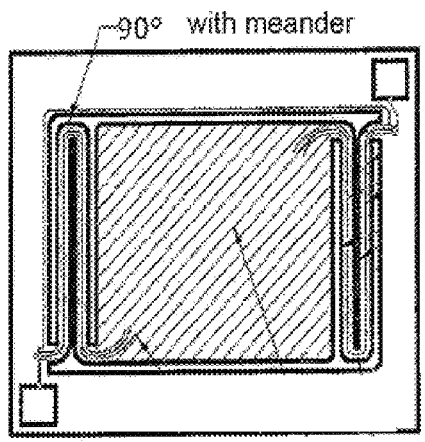
Figure 1:
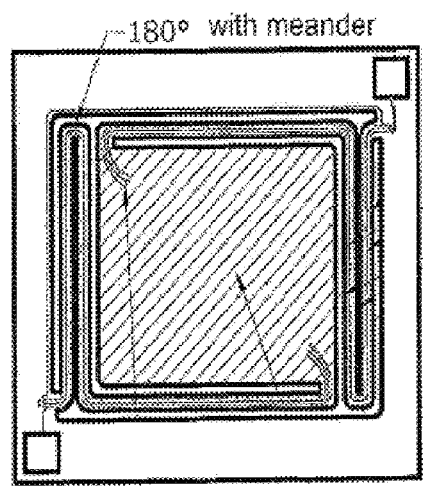

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in this document reference is made to "high vacuum", reference is made to a pressure lower than 100 mPa.

In the present invention, the term "filling ratio" or "filling factor" can be determined as the surface area spanned by the membrane compared to the cross-sectional surface area present in the cavity (not taking into account the beams), as can be determined in a plane substantially parallel to the substrate. The cross-sectional surface area considered typically is the cross-sectional surface of the cavity in the plane where the membrane is suspended In the present invention, the unit of 1 bar corresponds to 10^5 Pa=100 000 Pa, and 1 mbar corresponds to 100 Pa.

In order to illustrate the features and advantages of embodiments of the present invention, first some thermal infrared sensors are discussed known in prior art.

FIG. 1(a) to FIG. 1(d) represent four embodiments of prior art infrared thermal pixels, all having a cavity with a square/rectangular circumference, a substantially square/rectangular membrane (in the middle) which is completely filling the space of the cavity except for the space taken by the beams and a small spacing on both sides of the beams. The membrane is suspended by two narrow beams, each carrying three thermocouples connected in series to form a thermopile. The beam length of the embodiment of FIG. 1(a) is substantially equal to 1× the length of the side of the membrane, and a small spacing is present on both sides of the beam. FIG. 1(b) shows a variant of the thermal pixel of FIG. 1(a) wherein the length of each beams is twice the length of the side of the membrane. FIG. 1(c) shows a variant of the pixel of FIG. 1(b) wherein the length of the beams is also twice the length of the side of the membrane, but wherein the beam is shaped as a meander. FIG. 1(d) shows yet another variant, whereby the length of the beams is 2× the width plus 1× the length of the membrane. Nevertheless, for the reader confronted with these different designs, it is not clear which length of the beams should be chosen for an optimal design.

The question of how the beams and thermocouples should ideally be designed to obtain an "optimal sensor" becomes even more difficult to answer for a sensor in which the membrane has an area substantially smaller than the cavity, e.g. having a filling ratio of 50% or less, and/or has a non-rectangular shape, e.g. a circular shape. This is a problem the inventors were confronted with.

Figure 2:
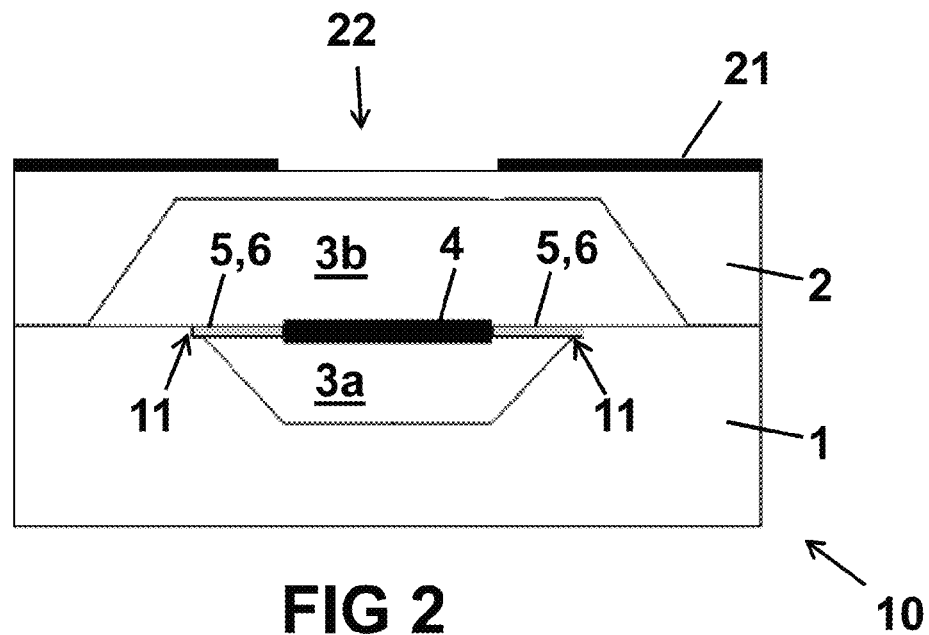
FIG. 2 is a schematic representation of an infrared thermal sensor with its main components, in cross section.

Before discussion the solutions proposed by the present invention, the basic structure of an exemplary thermal sensor 10 is explained with reference to FIG. 2. Whereas embodiments of the present invention are not strictly limited by all features in the exemplary thermal sensor, the principles of embodiments of the present invention can for example be easily applied to a thermal sensor as shown. FIG. 2 shows an infrared thermal pixel 10 comprising a substrate 1 (also called "bulk"), where a relatively thin structure 4, referred to as "diaphragm" or "membrane" 4 is formed, which is connected to the substrate 1 by means of so called "beams" 5 (also known as "webs"). The substrate material under the beams 5 and under the membrane 4 is preferably completely removed by means of known techniques, e.g. by etching techniques, leaving a cavity 3a underneath the membrane 4 and the beams 5. A cap structure 2, made of a material transparent to infrared (IR) light, and having a cavity 3b typically is placed above the membrane 4, and is sealed to the substrate 1, so that the membrane 4 and the beams 5 are encapsulated in a closed cavity 3 (combination of cavity 3a and 3b). The pressure "p" inside the cavity 3, and the gas composition inside the cavity 3 may be largely determined by the sealing technique used, but has an important impact on the design and performance of the infrared thermal sensor. In fact, two major sealing techniques are typically used for infrared thermal sensors: (1) metallic or eutectic layer bonding, providing a "high-vacuum" pressure in the cavity 3, or (2) glass-frit wafer bonding, resulting in a typical pressure of about 10 to 100 mbar (1 kPa to 10 kPa). Although "air" can be used as the gas composition, some prior art devices use a special gas having a low thermal conductivity, such as e.g. Krypton gas, for improving the performance. Most of the cap structure 2 is covered with a non-transparent material 21, except for an "opening" 22 (also known as "aperture" or "window") for allowing IR light to reach the membrane 4.

The size and/or shape of the membrane 4 can in principle be chosen for various reasons, for example: to absorb as much radiation as possible, not to lose too much heat through the air, the smaller the membrane the longer the beams, field of view. To optimize the membrane for a certain field of view, the aperture 22 typically also is taken into account. The distance between the aperture 22 and the membrane 4 has also an influence. When this distance is higher, the aperture 22 and the membrane 4 can be larger for the same field of view. However, for the present invention it is assumed that the cavity 3 (and aperture 22 and pressure and gas composition) and the membrane 4 (size and shape) are predetermined, and that only the beams 5 and the thermocouples 6 can be determined. The task of the inventors is thus to find a suitable, e.g. most suitable set of beams and thermocouples.

Figure 3:
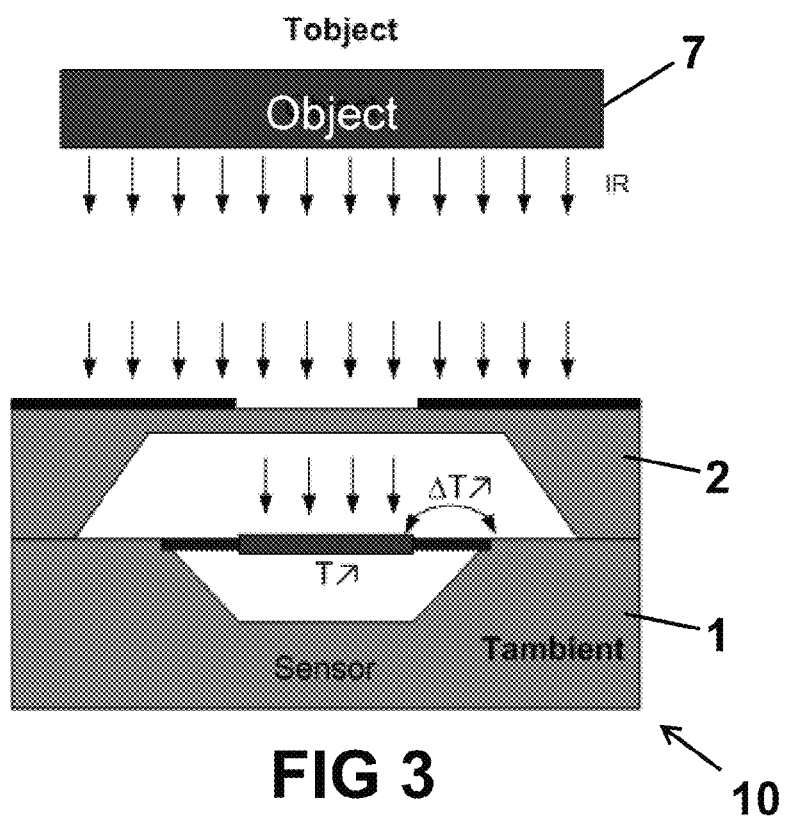
FIG. 3 illustrates how an external object (or subject) sends IR radiation through a window or aperture towards the membrane, which warms up.

FIG. 3 shows the exemplary IR thermal sensor of FIG. 2 and an external object 7 which is to be detected or for which its temperature $T_{object}$ is to be determined. Every object with a temperature higher than 0 Kelvin will radiate infrared (IR) radiation. Depending on the temperature of the object ($T_{object}$), the amount of infrared radiation sent by the object 7 and received by the sensor 10 will vary. Therefore, by measuring the amount of radiation, and by determining the temperature of the substrate 1 using known techniques, the temperature of the object 7 can be determined. The infrared radiation IR is absorbed on a membrane 4 which is substantially thermally isolated from the bulk 1 by means of the cavity. The membrane 4 will heat up due to absorption of this IR radiation. The temperature difference may e.g. be in the order of 20 mK for an object having a temperature of about 60° C. in an environment of about 20° C. The infrared radiation typically is blocked from the surrounding bulk 1 by an aperture layer 21 so that the bulk material 1 will not heat up due to the infrared radiation. It is noted that the bulk material is very big compared to the dimensions of the membrane 4, and can be seen as a heat sink having a substantially constant temperature equal to the temperature of the environment. The substrate 1 can e.g. be silicium, or other suitable semiconductor materials.

If the object 7 is warmer than the environment of the sensor 10, there will be more IR radiation from the object 7 to the sensor than vice versa. This IR radiation will be absorbed by the membrane 4 and therefore the membrane 4 will (slightly) warm up. Because the temperature of the bulk 1 is substantially constant and equal to the ambient temperature, the temperature of the membrane 4 will increase by an amount of $\Delta T$ above the temperature of the substrate 1, which temperature difference $\Delta T$ can be measured, and is an indication of the IR radiation emitted by the object 7, which in turn is an indication of the temperature of the object 7.

Figure 4:
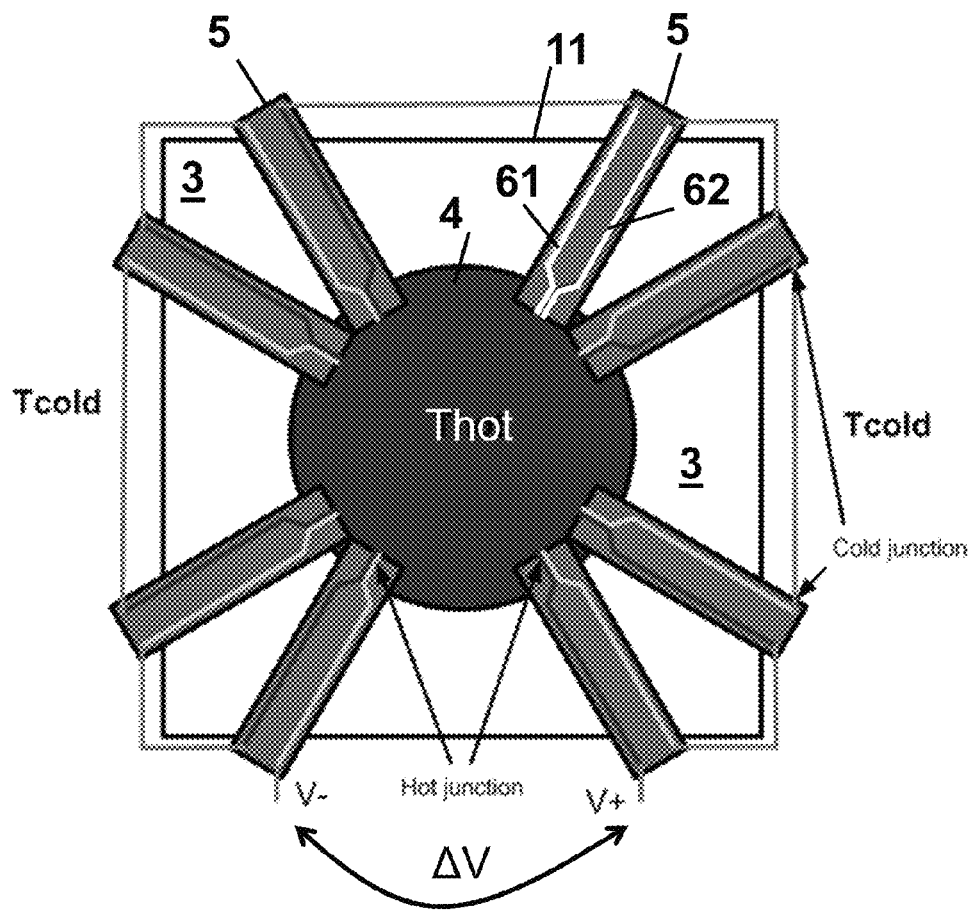
FIG. 4 shows how thermocouples located on the beams convert the temperature difference in a voltage signal.

Referring to FIG. 4, the temperature difference $\Delta T$ between the membrane 4 and the bulk 1 can be measured by placing thermocouples 6 between the membrane 4 and the bulk 1. As is well known in the art, a thermocouple 6 typically comprises or consists of two thermocouple-legs 61, 62 made of a different material, and will generate a voltage difference $\Delta V$ due to the Seebeck effect, which voltage difference ΔV is dependent on the temperature difference ΔT between the two nodes of the thermocouple, (and on the materials used for the thermocouple-legs, but the materials are predetermined), but is independent of the length and/or width of the thermocouple wires 61, 62, also known as "thermocouple legs" (assuming no current is flowing). The voltage ΔV generated by a single thermocouple is typically very small (order of micro-volts for a temperature difference ΔT of e.g. 40° C.).

The thermocouple legs 61, 62 may e.g. be constructed of n and p type polysilicon. The voltage ΔV created by a single thermocouple 6 is then calculated in the following way:

$$\Delta V = \alpha * (T_{hot} - T_{cold})$$
$$\alpha = \pm cst * \ln\left(\frac{\rho}{\rho_0}\right)$$

where $T_{hot}$ is the temperature of the membrane 4, $T_{cold}$ is the temperature of the bulk 1, $\rho$ is the thermal resistivity of the polysilicon, $\rho_0$ and cst are constant values, whereby the positive sign is selected for p type silicon and the negative sign is selected for n type silicon. By connecting the legs 61, 62 of a thermocouple 6 together, the voltage differences are summed. By connecting multiple thermocouples 6 in series (the series connection being known as a "thermopile"), a larger voltage difference is created.

It is noted that the thermocouples 6 also have a certain electrical resistance depending on the doping level. Placing all the thermocouples 6 in series will also place these electrical resistances in series. The total electrical resistance will therefore be the sum of the electrical resistances of each thermocouple 6. The thermal noise (also known as "Johnson noise") generated by the thermopile is proportional to the square-root of this total electrical resistance.

Although from the description above, it may at first sight seem clear (at least from an electrical point of view) how the total signal ΔV is generated, and how the total noise is generated, in practice it is not at all simple to design a good infrared thermal sensor 10, or to improve the SNR of an existing infrared thermal sensor 10, because, even if the cavity 3 (e.g. size and shape) and the pressure is fixed, the membrane 4 (e.g. size and shape) and the beams 5 (e.g. number, length, width) and the thermocouples 6 (number, length, width) influence the thermal behaviour of the membrane 4, and thereby also the temperature difference ΔT, which in turn has an impact on the voltage ΔV. It is therefore not at all easy to predict how a particular design-change of the beams will influence the SNR, because of the mutual interaction between the electrical, thermal, and (to a lesser degree) also the mechanical aspects of the beams 5.

Figure 5:
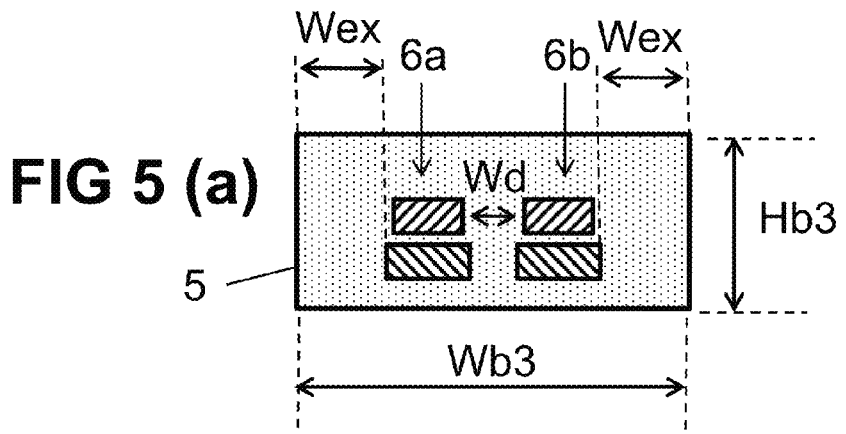
FIGS. 5(a) to 5(c) shows several possible ways to arrange thermocouples on beams.
Figure 5:
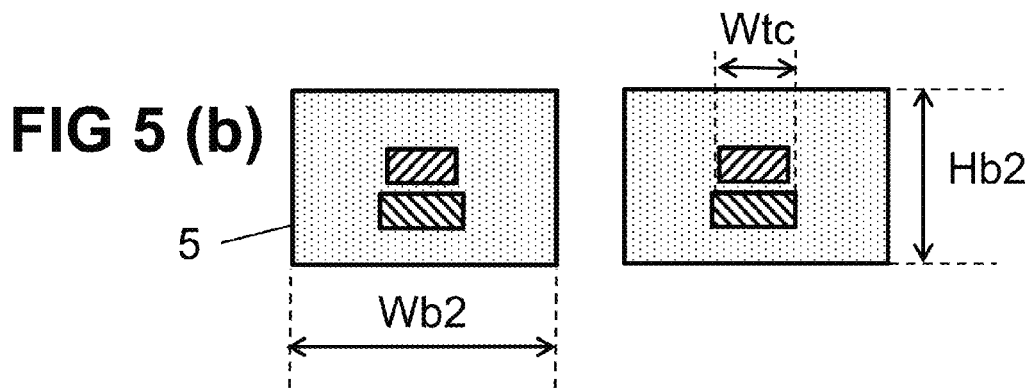
Figure 5:
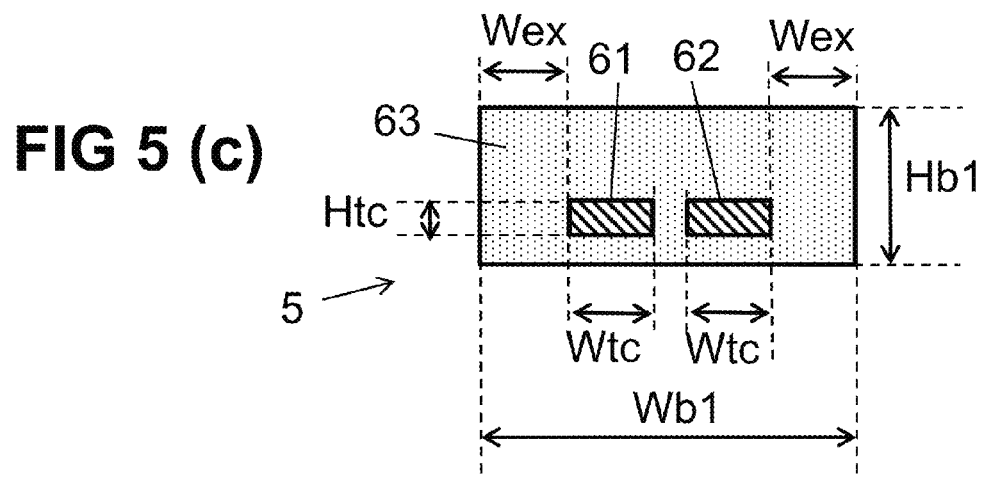

FIG. 5(a) to FIG. 5(c) show several possible ways of how thermocouples 6 can be arranged on beams 5, however, the invention is not limited hereto, and other arrangements may also be used. These drawings are not drawn to scale. The beam of FIG. 5(c) has a single thermocouple 6 with two legs 61, 62 arranged next to each other. The beam has a width $w_{b1}$, and comprises an n type and p-type poly-silicon resistor 61, 62 to make the thermocouple 6, but there is also extra passivation 63, e.g. nitride and oxide placed around the poly-silicon. The width $W_{ex}$ of this passivation $W_{ex}$ is preferably chosen as small as possible for minimizing the thermal conductance of the beam, and may e.g. be chosen to be about 1.5 micron for avoiding etching of the thermocouples during the under etching of the membrane and the beams during production. In a standard CMOS process, a typical height of the thermocouple legs $H_{tc}$ is about 0.3 micron, and a typical height of the beam $H_{b1}$ is e.g. about 7 micron. The width of the thermocouple legs $W_{tc1}$ and $W_{tc2}$ is preferably equal, and can be chosen by design within a large range, e.g. in the range of 5 micron to about 50 micron, and even beyond this range.

As can be seen in FIG. 5(b), the two thermocouple legs 61, 62 may also be arranged on top of each other, in which case the width of the beam 5 can be reduced to a width $W_{b2}$ smaller than the width $W_{b1}$, assuming the same width $W_{tc}$ of the thermocouple legs. This is advantageous because in this way the total thermal resistance of the beam (excluding the thermocouples), which is substantially proportional to the cross section area of the beam, and inversely proportional to the length of the beam, can be increased. In view of the small thickness of the thermocouple legs (poly-silicon layer), it is noted that the decrease in width $W_{b2}$ far outweights the small increase in height $H_{b2}$.

One can go one step further, as illustrated in FIG. 5(a) where two thermocouples 6a, 6b, each having two legs located on top of each other, are arranged on the same beam. As can be seen, by doing so, the beam width can be further reduced to a width $W_{b3}$ less than twice the width $W_{b2}$, and hence the total thermal resistance of the beam (excluding the thermocouples) can be further increased. Although not shown, it is also possible to place more than two thermocouples next to each other on the same beam, by adding another interdistance $W_d$ and thermocouple width $W_{tc}$.

From an electrical point of view, it should be mentioned that the beam material (e.g. comprising nitride and/or oxide) is an electrical insulator, hence the electrical resistance is only determined by the thermocouple legs 61, 62. Since the length and width and height of the thermocouple legs is substantially identical in each of FIG. 5(a) to FIG. 5(c), also the thermal noise generated by these thermocouples is substantially identical. For completeness, it is noted that the width of the upper thermocouple leg in FIG. 5(b) is in practice slightly smaller than that of the underlying thermocouple leg, due to processing constraints, but in this case the average width $W_{tc}$ of the thermocouple legs is taken as "the" thermcouple width.

From a mechanical point of view, it should be mentioned that the beams have a typical height of 7 μm, while the thermocouple legs 61, 62 are typically only about 0.3 μm thick, hence the height $H_{b3}$ of the beam of FIG. 5(a) is identical to the height $H_{b2}$ of the beam of FIG. 5(b), which is typically slightly larger than the height Hb1 of the beam of FIG. 5(c). Since the width $W_{b3}$ of the beam of FIG. 5(a) is slightly smaller than twice the width $W_{b2}$ of the beams of FIG. 5(b), it is mechanically only slightly weaker. Likewise, one beam of FIG. 5(b) is slightly weaker than the beam of FIG. 5(c).

In a first aspect, the present invention relates to an infrared thermal sensor for detecting infrared radiation. The infrared thermal sensor may comprises some features and advantages of the exemplary system as described above, although embodiments are not limited thereto.

The infrared thermal sensor comprises a substrate and a cap structure together forming a sealed cavity. It also comprises a membrane arranged in the cavity for receiving infrared radiation (IR) through a window or aperture. The sensor also comprises a plurality of beams for suspending the membrane. The plurality of beams comprises at least one beam having a thermocouple arranged therein or thereon for measuring a temperature difference (ΔT) between the membrane and the substrate, The plurality of beams also comprises at least one beam mechanically supporting the membrane without a thermocouple being present therein or thereon. In a particular example of a sensor with four beams, the SNR was improved by about 3 dB (if the absorption of the beams is not taken into account) by omitting two of the thermocouples. It is noted that the membrane or cavity of the sensor was not changed, and that the mechanical stability was substantially maintained, as the thickness of beams with thermocouples and without thermocouples is substantially the same.

The filling factor of the membrane in the cavity may be less than 50%. The filling factor may be determined as the surface area spanned by the membrane compared to the maximum cross-sectional surface area present in the cavity. It is advantageous to have a low fill factor if one wants to optimize the field of view. Alternatively, the filling factor may be larger than 50%, because if there is no or little loss through gas or air, the membrane may "catch" more radiation rendering the sensor more sensitive. In some examples, The filling factor may e.g. be smaller than 40%, e.g. about 30%. A typical example is a circular infrared thermal sensor having a diameter of about 255 micron, located in a square cavity having a length size of about 400 micron, hence the filling ratio is (pi×R×R)/(W×W)=about 32%. Such a membrane offers an excellent field-of-view (FOV), provided the aperture used is large enough.

It was surprisingly found that the signal to noise ratio can be improved or even optimized for infrared thermal sensors by determining design of the beams, for a given membrane and cavity. Whereas for high vacuum thermal infrared sensors there is a common believe that the best performance is obtained by choosing the membrane area "as large as possible" (high filling ratio), and the beams "as long and as thin as possible" (high thermal resistance) without losing mechanical strength and comprising a thermocouple. Nevertheless, according to embodiments of the present invention, an improved design of the beams, taking into account the presence or absence of a thermocouple, can be found.

The pressure in the cavity may be less than 10 Pa, advantageously between 1 Pa and 0.1 Pa. As the sensitivity does not improve significantly for lower pressures, it may be advantageous to operate in the pressure range 1 Pa to 0.1 Pa. According to embodiments of the present invention, a good, e.g. optimum design of the beams, taking into account the presence or absence of a thermocouple, can be found, especially for sensors operating at reduced pressure. As the signal of the thermocouple or thermopile is relatively small and needs to be amplified, the SNR of the original signal is very important to achieve high accuracy of the sensor.

As the pressure in the cavity decreases, the membrane loses more of its heat through the beams and thermocouples (conduction) and less heat via the membrane surface (radiation, convection and conduction), which typically results in a sensor structure with a low number of long and narrow beams and thermocouples. The present invention is particularly interesting for these kind of devices.

The beams in the plurality of beams may be selected so that a ratio of the thermal resistance (RT1) between the membrane and the substrate via radiation and convection and conduction through the gas medium in the cavity and through the part of the beam other than through the thermocouples, and the combined thermal resistance (RT2) between the membrane and the substrate through the thermocouples via conduction is a value in the range of 0.9 to 1.1.

The ratio of thermal resistance may in some examples be between 0.95 and 1.05, in other examples even be in the range of 0.99 to 1.01. It is an additional advantage of embodiments of the present invention that the heat transfer from the membrane to the substrate through the thermocouple legs on the one hand, is approximately equal to the sum of the heat transfers in other ways, in particular via the membrane surface by radiation and convection and conduction through the air (or other gas medium), and the heat transfer through the beam material (except for the thermocouple itself) via conduction, when in use.

For optimization and selection of the best solution (e.g. 1 beam with thermocouple+1 beam without thermocouple, or 2 beams with thermocouple+1 beam without thermocouple, or 2 beams with thermocouple+2 beams without thermocouple, etc), a number of specific circumstances (membrane, cavity, pressure, conductivity of the beams and the thermocouples, length of the beams as function of the available free space depending on the size of the membrane, etc.) may be taken into account for which solution provides a good improved or optimum SNR. Optimisation thereby may be performed taking into account that the thermal resistance from the membrane surface through and beams via radiation, convection and conductance is equal to the thermal resistance through the thermocouple(s).

It is an advantage of embodiments of the present invention that the above setup may result in a good or optimum signal to noise ratio (SNR) for a given mechanical stability. The above provides design rules for implementing an infrared thermal sensor, e.g. forms a basis for parameter selection of parameters defining the infrared thermal sensor. Design or optimization may for example be performed for fixed values of the pressure, the cavity size, the membrane size, conduction of the beams and thermocouples.

The membrane may be substantially circular in cross section in a plane parallel with the substrate. Using a circular membrane has the advantage of providing a uniform Field-Of-View. It may also improve the uniformity of the temperature over the membrane. It also may allow easier etching.

The cavity may have a substantially polygonal cross section with n corners in a plane parallel with the substrate. The polygonal may be a rectangle. The number of beams may be selected as function thereof, e.g. as a multiple of n, but other selections are equally possible, for example selecting three beams or even selecting two beams.

The number (Nb) of beams may be three, and two beams may comprise a thermocouple whereby one beam does not comprise a thermocouple, or one beam may comprise a thermocouple whereby two beams do not comprise a thermocouple.

It is an advantage of using three (or more) beams to suspend the membrane, because it prevents the membrane from rotating around its suspension points. In this way, the risk of the membrane becoming stuck during production (e.g. during front etching) are reduced or eliminated.

Having only three beams is sufficient for preventing flipping of the beams or for preventing large rotations, especially when a symmetric setup is selected. Nevertheless, if the beams are not positioned symmetrically, in some examples this could result in a sensor that can flip. Because one of the beams will not have a thermocouple, there typically will be a difference between the beams, so it's possible that the mechanical stress is also different and that the membrane will flip. Nevertheless, if a substantially symmetrical setup is used, the membrane will not be able to flip anymore. Furthermore, an asymmetry in the beams will give a different stress in the beams which is dangerous from mechanical point of view, e.g. if one beam is pushing more than another beam it might break . . . . This can be avoided or reduced by a substantial symmetrical setup. A symmetrical setup furthermore has the advantage of more optimal design possibilities.

Preferably the connection point(s) of the beam(s) without a thermocouple is/are located symmetrically with respect to the connection points of the other beams, which have a thermocouple, because this results in a more uniform temperature over the membrane. Such a symmetrical condition is furthermore advantageous for allowing good etching of the beams and from mechanical point of view.

In principle, one thermocouple on one of the three beams is sufficient for measuring the temperature difference, and this solution will provide the best SNR. However, an embodiment wherein only two beams have a thermocouple is also a good solution (better SNR than 3 beams having a thermocouple), and this may even be used to temporarily connect the thermocouples in anti-series for allowing determination of the zero-offset. Alternatively, at least three beams may be present.

The number (Nb) of beams may be four and three beams may comprise a thermocouple whereby one beam does not comprise a thermocouple, or two beams may comprise a thermocouple whereby two beams do not comprise a thermocouple, or one beam may comprise a thermocouple whereby three beams do not comprise a thermocouple.

All the thermocouples may be connected in series for providing a combined voltage signal (S) indicative for the effect of the infrared radiation (IR). A series connection of thermocouples typically is known as a "thermopile."

The infrared thermal sensor may comprise at least two thermocouples, and the at least two thermocouples may be connected in anti-series for allowing determination of the zero-offset. With "anti-series-connection" is meant that the legs of the same kind (e.g. made of n type poly-silicon) are connected together, resulting in two voltage signals which should ideally be the same. This allows determination of the zero-offset.

Figure 11:
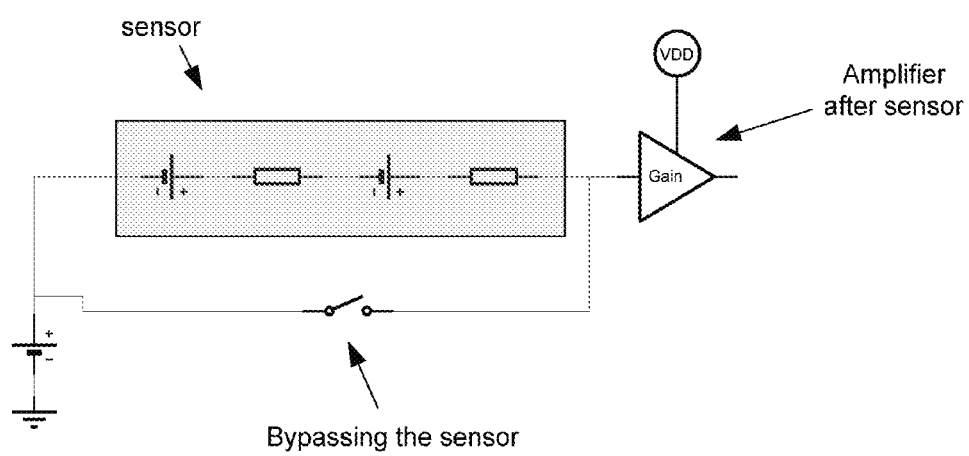
FIG. 11 and FIG. 12 illustrate electrical schemes for calibrating for zero-offset, FIG. 12 thereby illustrating an embodiment according to the present invention.
Figure 12:
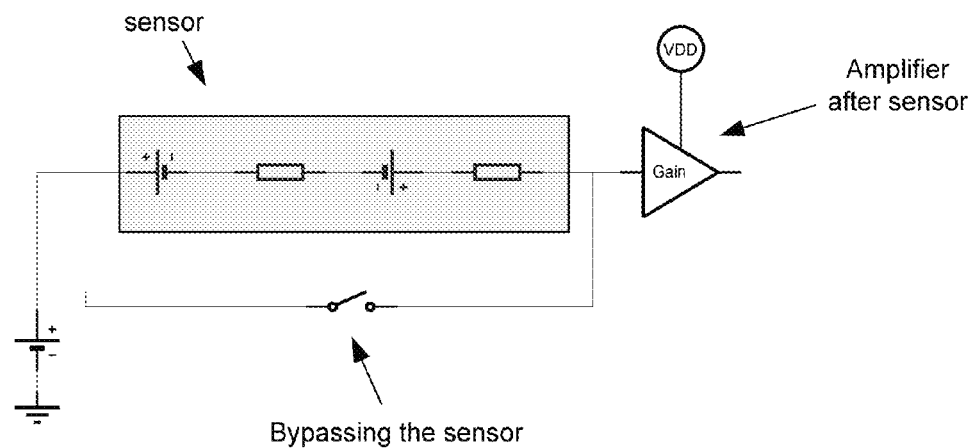

The zero-offset problem is shown in FIG. 11 and FIG. 12. One wants to be able to measure the amplifier (especially offset of amplifier) without the signal of the sensor. It is possible to do this by bypassing the sensor with a switch as indicated in FIG. 11.

In this case however the impedance seen at the input of the amplifier will be totally different (the resistance of the sensor will not be seen.)

It's much better to have the same impedance since this impedance will have a huge impact on electrical offset. Therefore it's much better to place the sensor in anti-series to do the measurement as indicated in the picture. This measurement can be done as a calibration, e.g. at start up but also after a certain amount of time of use, as this measurement can be done for calibrating an offset change of the amplifier. To maintain a good sensor, this measurement must be done good and correctly. The principle of measuring the offset and calibrating the system is not restricted to the specific sensors as discussed in embodiments of the present invention but also may be applicable more generally to thermal infrared sensors. A calibration system as well as a calibration method for calibrating a zero-offset of an infrared thermal sensor therefore also is envisaged by the present invention.

In embodiments where the anti-series connection is envisaged, it may be important to position the thermocouples as symmetrical as possible so that they provide as good as possible the same signal.

Each thermocouple may consist of an n type poly-silicon resistor in combination with a p type poly-silicon resistor, placed on top of each other. It is an advantage of a beam having two thermocouple legs (i.e. resistors) on top of each other, because the width of such a beam can be smaller than a beam having the same thermocouple legs located next to each other, hence the thermal resistance of the former beam (with the 2 thermocouples on top of each other) is smaller than the latter. It is noted that the electrical resistance (being determined by the length and width of the thermocouples) is the same for both beams, while the mechanical strength is substantially the same for both beams, because the thickness of the beam is fixed by the process, and the thermocouple leg is typically about 0.3 micron high, whereas the beam itself is typically about 7.0 micron high.

Thus by placing the thermocouple legs on top of each other, the thermal resistance can be reduced, while the electrical resistance and the mechanical stability are kept substantially the same.

The total electrical resistance of the sensor advantageously should be selected keeping the following in mind. The resistor of the sensor will give a certain noise. The amplifier after the sensor will also add some noise. Therefore the resistor should not be too small as this typically requires that the noise of the amplifier must be made small which will require more current consumption.

On the other hand, a too large resistor also has disadvantages. For example, due to some irregularities on the supply, there is coming some unwanted current from the supply through the resistor of the sensor. When this resistor is very larger, the voltage drop over the resistor will be large and it will kill the performance since the voltage at the input of the amplifier is changing.

By way of illustration further standard and optional features and advantages of embodiments of the present invention will be illustrated by discussing some examples or exemplary embodiments of thermal infrared sensors. For reasons of comparison, a thermal infrared sensor as known from prior art and as discussed above, with two beams, each beam having three thermocouples is shown in FIG. 6.

FIG. 8 shows an exemplary infrared thermal sensor with two beams, each beam having one thermocouple. The sensor illustrates the problem of mechanical stability that may arise. This sensor 10 has a circular membrane 4, although this is not essential for the invention, and the membrane may also have another shape, e.g. diamond, square, rectangular, polygon e.g. hexagonal, octagonal, or any other shape found suitable by the skilled person. The membrane 4 of this example has a filling ratio of about 35%, but the invention is not limited thereto, and other filling ratios may also be used, but the invention is especially applicable in thermal sensors having plenty of space for the beams. The cavity 3 is assumed to be at a pressure less than 10 Pa, preferably less than 1 Pa, e.g. at high vacuum. When the pressure inside the cavity is reduced, the heat dissipation from the membrane to the substrate through the air via radiation, convection and conductance is also reduced, and most of the heat from the membrane 4 is dissipated via the beams. By increasing the thermal resistance of the beams, the heat dissipation is reduced, and the temperature of the membrane 4 is increased. For that reason, as is well known in the prior art, the number of beams is preferably chosen as small as possible, and their length is preferably chosen as long as possible, and their cross section (or width, since the height is typically fixed by the process being used, e.g. standard CMOS process), is also chosen as small as possible. Typically only one thermocouple is placed on the beams, for limiting the heat flow. A problem of very long and very narrow beams is the lack of sufficient mechanical rigidity, and therefore the design is often limited by mechanical constraints rather than by thermal or electrical considerations. Whatever design rules are used, at some point in time, a certain length and a certain width is chosen for the beams, and that choice determines the SNR of the signal generated by the thermocouples on the beams. This SNR is represented by a black circle in the graph of FIG. 10. Its absolute position is not important to explain the present invention.

It is noted that the sensor of FIG. 8 also had the problem that the membrane 4 could largely rotate or flip between the points A and B, e.g. during the etching process, and became stuck to the substrate 1, rendering the sensor useless.

FIG. 7 shows the same sensor as that of FIG. 8, having the same cavity, membrane, pressure, etc, except that it now has four beams instead of two. The four beams have the same dimensions as those of FIG. 8. This solution addresses the rotation-problem, because now the membrane is held by four points instead of two, hence rotation is prevented. By the addition of four beams, the mechanical stability is increased, but at the same time, the thermal resistance of the beams is decreased.

Assuming no heat (or a negligible amount) is lost through the air (i.e. assuming a low pressure is used), substantially all heat is lost through the beams. When going from two beams to four beams, the amount of beams is doubled and therefore the thermal resistance is divided by 2. The temperature difference ΔT between the membrane 4 and the substrate 1 therefore would typically drop by a factor of about 2.0, but because we have twice as much thermocouples, the signal between a two beam or four beam sensor will be the same. However, because the total length of the thermocouples has doubled, the electrical resistance of the thermocouples has also doubled, and thus the thermal noise (also known as "Johnson noise") of the sensor is increased. Thus, since the signal has remained substantially the same, while the noise has increased, the SNR is reduced by about 3 dB. The SNR of this sensor with four beams and four thermocouples is represented by a black triangle in the graph of FIG. 10, and is lower than that of the sensor of FIG. 8, nevertheless the sensor is far better with respect to mechanical stability. Of course, the exact temperature drop ΔT, and the exact values of the SNR will depend on the actual characteristics of the sensor under consideration (e.g. cavity size and shape, membrane size and shape, gas medium, pressure, etc).

The inventors have realized that by omitting two of the thermocouples, while maintaining the four beams provided a significant improve of the SNR of the sensor of FIG. 7 without decreasing its mechanical properties. This is in contrast with typical prior art infrared thermal sensors that always have at least one thermocouple on each beam.

FIG. 9 shows an infrared thermal sensor 10 with four beams, only two beams having a thermocouple. The beams 51a, 51b with a thermocouple have a darker color in the drawing, the beams 52a, 52b without a thermocouple have a white color in the drawing.

Simulations have shown that the SNR of the sensor of FIG. 9 is higher than the SNR of the sensor of FIG. 7, but lower than that of the sensor of FIG. 8. The result of one such simulation are shown in Table 1.

TABLE 1

|  | 2 beams (FIG. 8) | 4 beams (FIG. 9) |
| --- | --- | --- |
| Cavity (um) | 400 × 400 | 400 × 400 |
| Membrane diameter (um) | 255 | 255 |
| Electrical res (Ohm) | 78k | 157k |
| Width thermocouple (um) | 4.15 | 4.15 |
| Temp diff (K) | 0.0352 | 0.0187 |
| Output Voltage (V) | $2.03*10^{-4}$ | $2.17*10^{-4}$ |
| SNR (dB) | 41.1128 | 38.6554 |

As can be seen, the SNR of the sensor with four beams but only two thermocouples is about 2.5 dB lower than that of the sensor with two beams, which is an improvement of about 0.5 dB.

Figure 10:
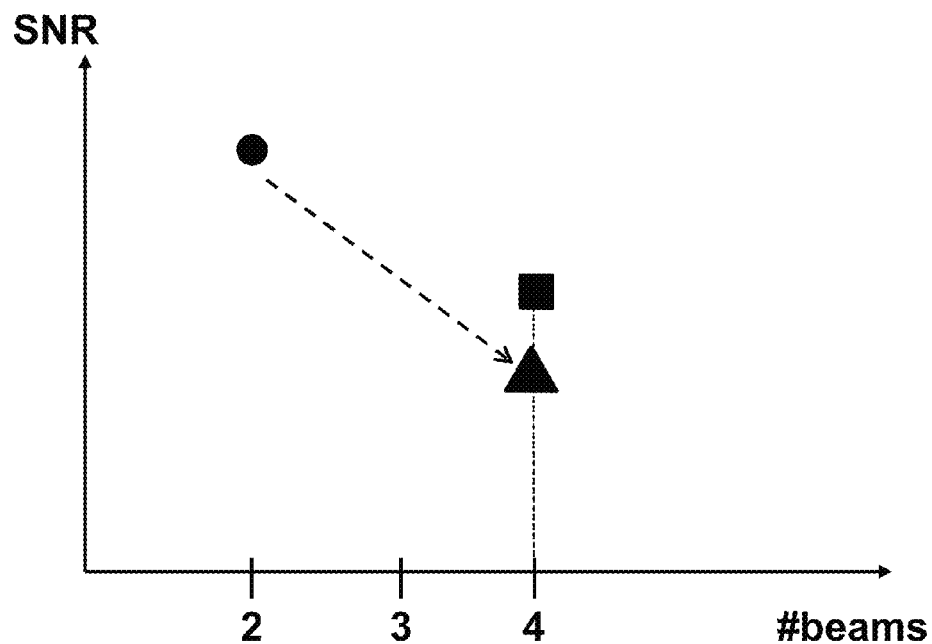
FIG. 10 is a graphical representation of the signal-to-noise ratio SNR of the infrared thermal sensor with four beams and four thermocouples of FIG. 7 (triangle), the infrared thermal sensor with two beams and two thermocouples of FIG. 8 (circle), and the infrared thermal sensor with four beams and only two thermocouples of FIG. 9 (square).

The SNR of the sensor with four beams, only two of which have a thermocouple, is indicated by the black square in the graph in FIG. 10. This sensor has substantially the same mechanical stability as the sensor of FIG. 7, because the height and the width of the beams without a thermocouple is substantially the same as the beams with a thermocouple, because the height of the beam itself is typically in the order of 7.0 micron, while the height of the thermocouple legs is typically only in the order of 0.3 micron (for a standard CMOS process), and the width is the same for all beams.

The contact points A, B, C, D of the beams and the membrane are preferably located at diagonal positions of the circular membrane. This may help to keep the temperature on the substrate more uniform, and helps to prevent rotation of the membrane. But this is not absolute required, and the contact points may also be located differently.

The beams of FIG. 9 are not parallel to the sides of the cavity. The reason for this is because it allows more easy manufacturing of the beams.

It is noted that the beams shown in the drawing of FIG. 9 each consist of three segments, which segments are interconnected at 90° angles. This is however not essential for the invention, and more or less segments may also be used. For example, a serpentine structure could also have been used. An advantage of using a spiral-like arrangement, is that it may help to reduce stress, in that it allows rotation of the membrane in a plane parallel to the substrate.

Preferably the two legs of the thermocouples are located on top of each other, as described above, in relation to FIG. 5(b). The two thermocouples of the sensor 10 of FIG. 9 may be connected in series, for forming a thermopile, or they may be connected in anti-series for allowing determination of the zero-offset.

In an alternative embodiment (not shown), the sensor 10 has four beams, but only one beam has a thermocouple. In an alternative embodiment (not shown), the sensor 10 has four beams, but only three beams have a thermocouple.

In an alternative embodiment (not shown), the sensor 10 has three beams, but only one beam has a thermocouple. Depending on the actual sensor, three beams may also be sufficient to prevent rotation of the membrane, and to provide sufficient mechanical stability.

In an alternative embodiment (not shown), the sensor 10 has three beams, but only two beam have a thermocouple.

FIG. 10 is a graphical representation of the signal-to-noise ratio SNR of the infrared thermal sensor with four beams and four thermocouples of FIG. 7 (triangle), the infrared thermal sensor with two beams and two thermocouples of FIG. 8 (circle), and the infrared thermal sensor with four beams and only two thermocouples of FIG. 9 (square).

REFERENCES 1 substrate (bulk)
11 edge
2 cap
21 aperture layer
22 aperture
3 cavity
4 membrane
41 slits
5 beam (web)
51 beam with thermocouple
52 beam without thermocouple
6 thermocouple
61 n type polysilicon resistor
62 p type polysilicon resistor
63 passivation
7 object
10 infrared thermal pixel
ΔT temperature difference between membrane and substrate (bulk)
D diameter
H height
L length
W width

The invention claimed is:

1. An infrared thermal sensor for sensing infrared radiation, the infrared thermal sensor comprising
a substrate and a cap structure together forming a sealed cavity;
a membrane arranged in said cavity for receiving infrared radiation (IR) through a window or aperture;
a plurality of beams configured for suspending the membrane comprising at least one beam having a thermocouple arranged therein or thereon for measuring a temperature difference (ΔT) between the membrane and the substrate, the plurality of beams furthermore comprising at least one beam mechanically supporting the membrane without a thermocouple being present therein or thereon.

2. The infrared thermal sensor according to claim 1, wherein the filling factor of the membrane in the cavity is less than 50%.

3. The infrared thermal sensor according to claim 1, wherein the pressure in the cavity is less than 10 Pa.

4. The infrared thermal sensor according to claim 1, wherein the beams in the plurality of beams are selected so that a ratio of the thermal resistance between the membrane and the substrate via radiation and convection and conduction through the gas medium in the cavity and through the part of the beam other than through the thermocouples, and the combined thermal resistance between the membrane and the substrate through the thermocouples via conduction is a value in the range of 0.9 to 1.1.

5. The infrared thermal sensor according to claim 1, wherein the membrane is substantially circular in cross section in a plane parallel with the substrate.

6. The infrared thermal sensor according to claim 1, wherein the cavity has a substantially polygonal cross section with n corners in a plane parallel with the substrate.

7. The infrared thermal sensor according to claim 6, wherein the polygonal is a rectangle.

8. The infrared thermal sensor according to claim 1,
wherein the number of beams is three;
and wherein two beams comprise a thermocouple and one beam does not comprise a thermocouple, or one beam comprises a thermocouple and two beams do not comprise a thermocouple.

9. The infrared thermal sensor according to claim 1,
wherein the number of beams is four;
and wherein three beams comprise a thermocouple and one beam does not comprise a thermocouple, or two beams comprise a thermocouple and two beams do not comprise a thermocouple, or one beam comprises a thermocouple and three beams do not comprise a thermocouple.

10. The infrared thermal sensor according to claim 1, wherein all the thermocouples are connected in series for providing a combined voltage signal indicative for the effect of the infrared radiation.

11. The infrared thermal sensor according to claim 1, comprising at least two thermocouples, and wherein the two thermocouples are connected in anti-series for allowing determination of the zero-offset.

12. The infrared thermal sensor according to claim 1, wherein each thermocouple consists of an n type poly-silicon resistor in combination with a p type poly-silicon resistor, placed on top of each other.

13. A sensor system comprising at least one infrared thermal sensor according to claim 1.

14. A method for sensing infrared radiation comprising utilizing an infrared thermal sensor according to claim 1.

* * * * *